United States Patent [19]

Torres

[11] Patent Number: 5,376,000
[45] Date of Patent: Dec. 27, 1994

[54] APPARATUS AND PROCESS FOR EXTRACTING METAL VALUES FROM FOUNDRY SANDS

[75] Inventor: Jaime V. Torres, Pachuca, Mexico

[73] Assignee: Instituto Nacional De Investigaciones Nucleares, Piso, Col. Lomas Barrilaco, Mexico

[21] Appl. No.: 161,759

[22] Filed: Dec. 3, 1993

Related U.S. Application Data

[62] Division of Ser. No. 888,970, May 26, 1992.

[51] Int. Cl.$^5$ ............................................. F27B 15/00
[52] U.S. Cl. ......................................... 432/14; 432/15
[58] Field of Search ..................................... 432/14, 05

[56] References Cited

U.S. PATENT DOCUMENTS

| | | | |
|---|---|---|---|
| 4,303,448 | 12/1981 | Palmour et al. | 501/127 |
| 4,361,405 | 11/1982 | Weder et al. | 366/7 |
| 4,432,666 | 2/1984 | Frey et al. | 405/129 |
| 4,437,834 | 3/1984 | Vogel | 432/14 |
| 4,563,151 | 1/1986 | Vogel | 432/15 |

OTHER PUBLICATIONS

Baek, N., et al. Proc. Natl. Conf. Hazard Wastes, Hazard Mater, 7th, 317–21, 1990, Hazard Mater Res. Control Inst.
Warren, G., et al., EPO Congr. 91, Proc. Symp. TMS Annu. Meet., 85–101, 1991, Edited by Gaskell, Miner Mel Mater Soc.
Krishnaswamy, R, Report, Bumines-OFR-119-84 Order No. PB 84-207091 128 pp. 1984.

*Primary Examiner*—Paul J. Killos
*Attorney, Agent, or Firm*—Ladas & Parry

[57] ABSTRACT

Apparatus and process for extracting simultaneously metal values from foundry sands, said apparatus comprising a thermostated column which is in flow communication with a controlled air supply source and with a heating system arranged to keep said column at a predetermined temperature; said column is adapted to receive the necessary components to form an aqueous pulp from which the metal values are to be extracted, and has a device for finely dividing the airflow coming from the supply source in order to obtain a suitable suspension and homogenization of said pulp. In turn, the process comprises the steps of introducing into the thermostated column certain reagents, distilled water and pulverized foundry sands which form an aqueous pulp and processing it for a predetermined period of time under controlled temperature and airflow and pH conditions, after which the pulp is removed from the column and heated again at a temperature and for a period of time different to the above mentioned ones and it is finally filtered to obtain a metal containing solution.

11 Claims, 4 Drawing Sheets

APPARATUS AND PROCESS FOR EXTRACTING METAL VALUES FROM FOUNDRY SANDS

This is a divisional of copending application(s) Ser. No. 07,888,970 filed on May 26, 1992.

BACKGROUND OF THE INVENTION

The invention refers to an apparatus and process for extracting metals from foundry sands and, more specifically, to an apparatus and process for extracting these metals by making use of a thermostated column.

In the field of metal extraction based on foundry sands, the extraction techniques most utilized to date in a liquid-solid system involve mechanically-stirred leaching tanks, the Pachuca tank and Bonotto, Kennedy or Rotocel extractors. None of this equipment, however, has been specifically designed to extract small quantities of metals from foundry sands, which represents a problem not, until now, resolved.

Of the conventional apparatus mentioned above, the Pachuca tank is that which most resembles the apparatus object of the present application. However, the thermostated column of the new apparatus differs from the Pachuca tank insofar as regards its air dispersion system, the use of decarbonated and humidified air, because it consists of a heating jacket and because temperature control of the heating fluid is by means of a thermostat. These features of an apparatus which it is desired to protect allow for a suitable pulp suspension, prevent the formation of a silicate and carbonate layer at the bottom of the column, permit better temperature control and a fine control of process variables, such as the pH, the air flow and the solution's oxidation-reduction potential.

SUMMARY OF THE INVENTION

The apparatus and process of the present invention allow low concentrations of the metals contained in foundry sands to be simultaneously extracted, thus achieving two main goals which are: 1) The recovery of metal values which can be recycled, and 2) An important reduction in the toxicity of the sands which, once treated, can be handled as normal industrial waste, with important savings. From among the metals which it is possible to recover with the apparatus one can mention, among others, platinum, gold, cobalt, germanium, zinc, manganese, silver and copper, metals with many industrial uses, and some others such as chromium, vanadium and arsenic, which are highly toxic.

In order to achieve its purpose, the apparatus consists of a thermostated column which is connected to a decarbonated and humidified air supply source, and with a controlled heating system. This column includes an inlet for introduction of the components to form an aqueous pulp, and device for sparging it in such a way that a suitable suspension and homogenization of same is obtained. For its part, the process is characterized by the introduction into the column of some reagents, distilled water and foundry sands in order to form an aqueous pulp which is processed in same for 24 hours under controlled temperature, air flow and pH conditions. Upon termination of the above-mentioned period, the pulp in the column is extracted and once again heated for 20 minutes, after which it is filtered in order to obtain a mother liquor with the metals in solution.

Another distinctive characteristic of this process is that, as distinguished from the existing system, it permits the extraction of metals from metallic alloys, the thermodynamic stability of which is higher than covalent bonds.

DESCRIPTION OF THE DRAWINGS OF THE PREFERRED EMBODIMENT OF THE APPARATUS

DETAILED DESCRIPTION OF THE INVENTION

Figure 1:
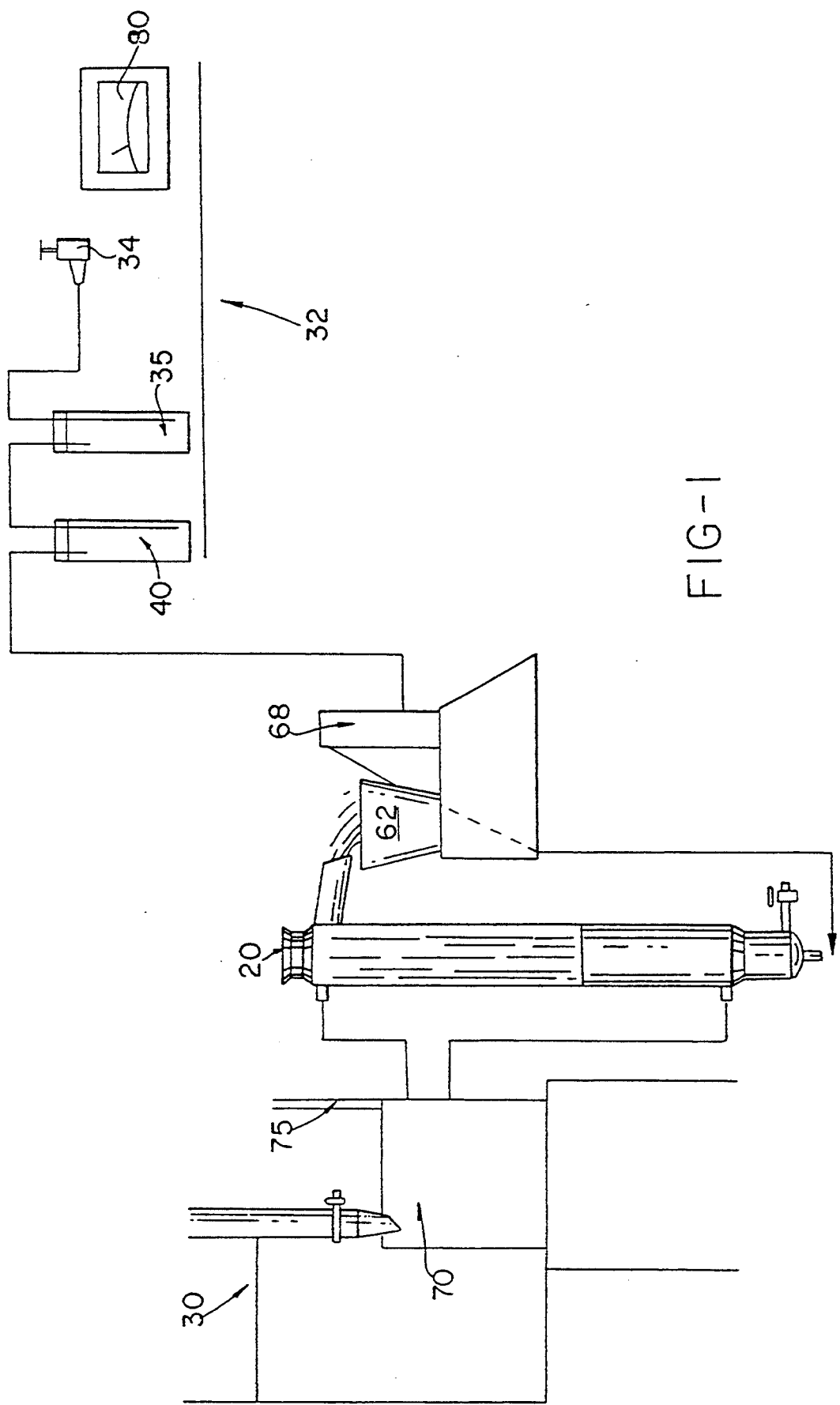
FIG. 1 is a general view of the apparatus utilized to extract metal values contained in foundry sands.
Figure 2:
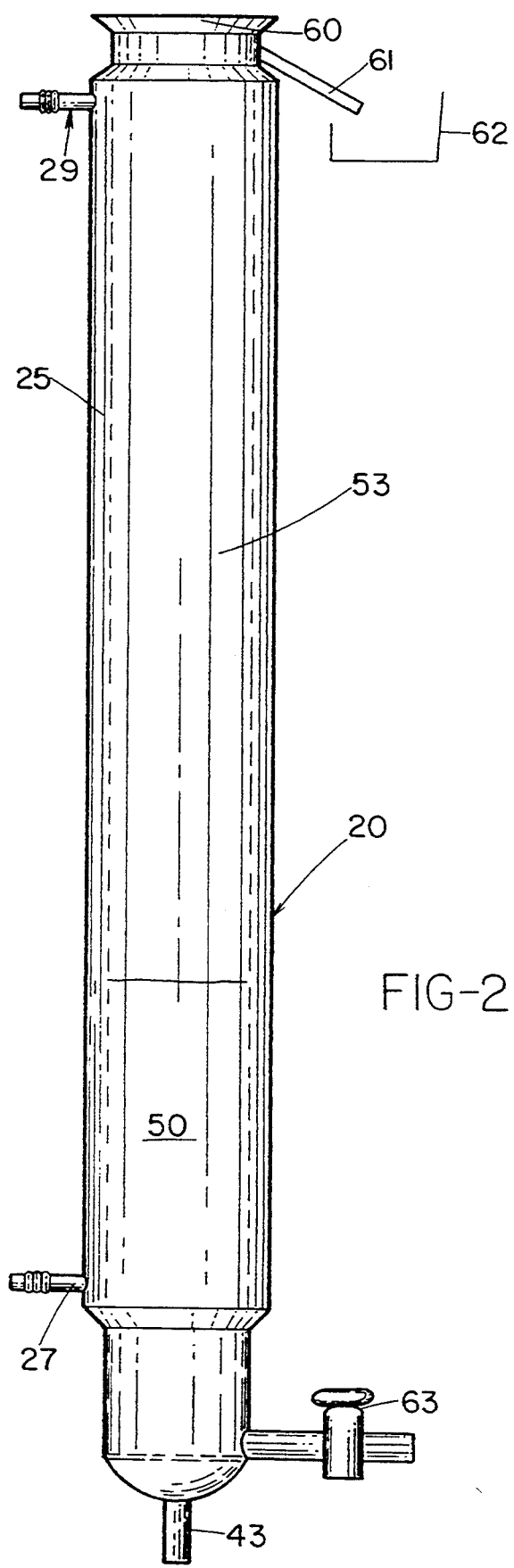
FIG. 2 is a side view of the thermostated column which forms part of the apparatus.
Figure 3:
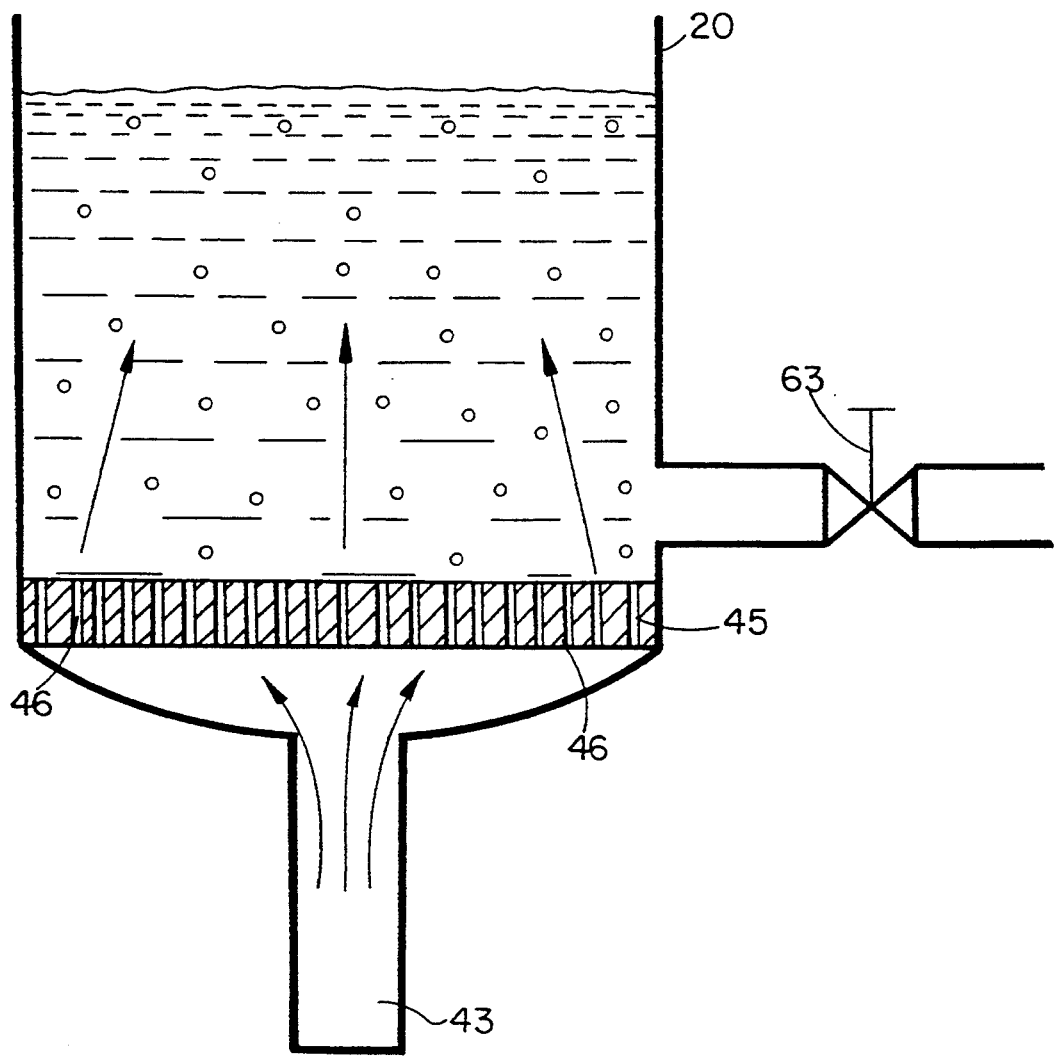
FIG. 3 shows the membrane device of the column.
Figure 4:
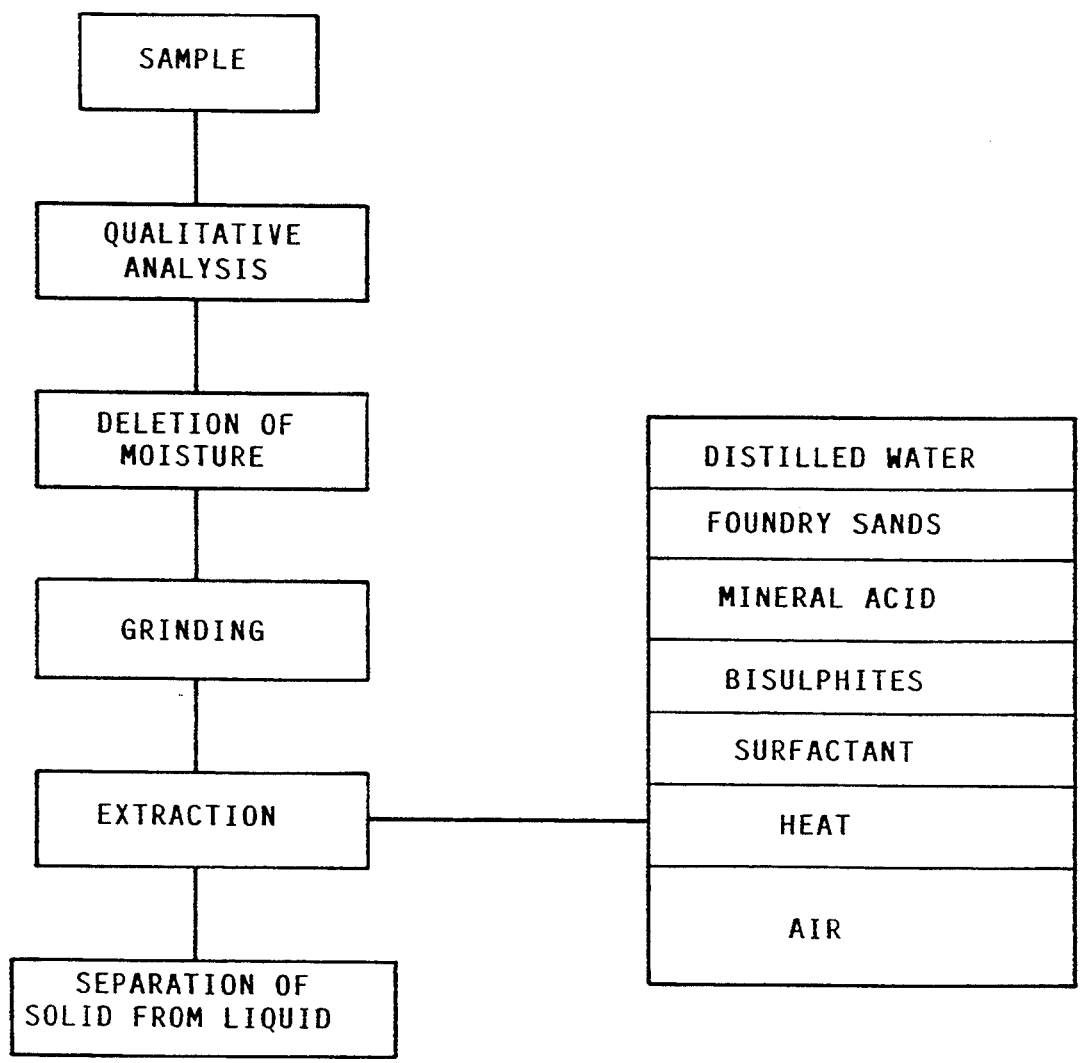
FIG. 4 is a block diagram of the process for the extraction of metal values from foundry sands.

In the structural aspect of the invention, this consists of an apparatus comprising a thermostated column 20 having a double wall defining a heating jacket 25 through which a heating fluid circulates coming from a heating system 30 which is in flow communication with said jacket by means of heating fluid inlet and outlet means 27,29 disposed in element 25 for connection with said system 30. The purpose of said heating system is to maintain the interior of the column 20 at an approximate temperature of 60° C., in accordance with one of the variables of the process for extracting metals from foundry sands. To this end, the heating system 30 includes thermal control devices such as a thermostat 70 and a thermometer 75 to control the temperature of the heating fluid.

The apparatus also includes a source 32 of supply of air to the column, where said source comprises a valve 34 for the admission of air and a decarbonating device 35 and a humidifier 40, the latter two placed in the path which communicates said source with the column. The air is passed through the device 35 and humidifier 40 before it reaches the column, to which it is introduced by an inlet 43 and crosses to a sparging device 45 placed next to said inlet which serves to finely divide the air in order to foster suitable suspension and homogenization of the pulp. Device 45 consists of a membrane with multiple orifices 46 of a diameter such as not to allow the pulp to pass through same towards the airflow inlet 43.

The upper end of the column 20 includes an opening 48 through which the different components forming the aqueous pulp 50 are introduced, said pulp containing the metals which it is desired to extract in accordance with the aim of the apparatus and process invented. Pulp 50 is placed in the inner chamber 53 of the column, which has been previously heated by the heating system 30 and supplied with air from supply source 32, with the characteristics mentioned hereinabove, wherein said pulp is sparged by the air flow crossing device 45 in order to provide it with the suspension and homogenization properties required for the process. A frosted glass cap 60 is placed in opening 48 in order to avoid the escape of air and foam. However, the column is provided with means 61 through which the foam may leave into a reservoir 62.

For extracting samples from the pulp during the process, the column has a valve 63 through which the necessary samples are taken to verify that the pulp being processed retains the ideal conditions for obtaining the desired results. In addition, a device 68 for controlling and measuring the airflow supplied to the column, is located at a point before the air inlet 43.

With regard to the process, the foundry sands are analyzed in order to verify their compatibility with said process and in order to subsequently carry out the corresponding metallurgic balances. Once analyzed, the sands are finely ground and suspended in an aqueous pulp with a solid-liquid ratio of 1 to 4 and the necessary reagents added; that from 10 to 40 g., of a mineral acid in order to reach a pH of 2, from 4 to 15 g., of a compound of the family of the bisulphites and from 0.3 to 1.5 g., of mono and dialkylamines amineoxides and ethoxylated alkylamines, all these reagents being of analytical grade. The addition of the surfactant is important because part of the metallic ions dissolved are adsorbed in the foam or co-precipitated with it. This type of surfactant is preferred because it is a cationic surfactant which reduces the surface tension and promotes foam formation, thus obtaining a greater efficiency in the leaching process.

EXAMPLE 1

Foundry sands obtained from cylinder head Vogel machines were analyzed by neutron activation, finding therein 18 elements such as Sm, W, Fe, Cr, As, Sb, Ga, Co, La, Na, Al, Mn, Pb, Cl, Br, Zn, Au and Pt. The metallic alloys present were studied by X-ray diffraction, detecting the following: FeSiC (Iron Silicon Carbide); Fe5SiBa (Iron Silicon Baride); Fe2SiTi (Iron Silicide Titanium); AlOH (Bayerite); SiO (Quartz); Fe Ni (Kamacite); Ni—Cr—Fe (Chromium, Iron, Nickel); Co2GeMn (Cobalt Germanium Manganese); Pb Pt (Lead Platinum); Au 4 Mn (Gold Manganese).

Sands were dried on a stove at a temperature of 60° C. for 60 minutes and were ground in a porcelain crucible until a fine dust was obtained. The pulp was then prepared using 250 g., of pulverized sand and one liter of distilled water, adding 8 g., of sodium bisulphite, 25 g., of sulphuric acid and 0.5 g., of dodecil sodium sulphate. The pulp prepared was introduced into the thermostated column which had previously been fed with a flow of decarbonated and humidified air.

The pulp was processed within the column for 24 hours with an airflow supply of 1.8 liters/minute for every liter of pulp, and the pH of same was controlled at a value of 2 by adding sulphuric acid or sodium hydroxide. It was necessary for this purpose to measure same every 10 minutes during the first 2 hours and thereafter every hour. The air supplied to the column was decarbonated with a trap 35 of potassium hydroxide and was humidified by circulation through a distilled water trap 40. During the time of the process the thermostated column 20 was maintained at a temperature of 60° C. by circulation of a heating fluid through jacket 25. Upon termination of the operation the pulp was removed from the column, verifying a reagent consumption as follows: 100 g., of sulphuric acid, 33 g., of sodium hydroxide and 2 g., of dodecil sodium sulphate for each kilogram of sand. The pulp was reheated at 60° C. for twenty minutes and filtered through a Büchner filter with a fine mesh paper filter, finding that the oxidation-reduction potential of the filtered matter containing the metals in solution was 277 mv at 20° C.

In order to be able to extract the layer of silicates and carbonates which formed at the bottom of the column, approximately 150 ml. of an aqueous solution with a pH of 7 was added to same, maintaining the temperature constant at 60° C., and mixing the resulting solution with that which had been obtained previously. The column was then cleaned, the air flow reestablished and the same sample, including the slimes reintroduced therein, processing the mixture for another 24 hours at 60° C. At the end of this time the sample was collected and it was noted on this occasion that no silicate and carbonate layer was formed.

The slimes were heated in a precipitate glass and were then introduced into the column into which air had previously been injected. A NaOH solution was then added until the pH remained constant at 12, and the same conditions were applied as with the acid solution; that is, a temperature of 60° C. and an airflow of 1800 cm/min. This process lasted 24 hours, the extraction test taking place in the same way as the acid test. In this case the extraction of metals was very poor, for which reason this process is not to be recommended.

Qualitative and quantitative analyses were made of the extracts by 3 methods, that is: analysis by neutron activation, plasma emission spectrometry and atomic absorption. Each determination was made at least 5 times in order to make statistical studies of the results.

EXAMPLE 2

11 g., of sodium bisulphite and 33 g., of sulphuric acid were added to a liter of water, the temperature was maintained constant at 60° C. and the airflow at 1800 cm/min, adding 250 g., of sands and then 0.6 g., of dodecil sodium sulphate. The pulp was processed under these conditions for 24 hours, after which the pulp was removed from the column and it was noted that no layer had been formed at the bottom of the column. The solution obtained was then filtered in the same way as in example 1, obtaining a liquid which was qualitatively and quantitatively identical to that obtained in the first example.

The invented apparatus further incorporated means 80 for controlling the pH of the pulp during the process for extracting the metal values, whereby a ready inspection of the conditions of this specific variable of the process is available.

Although the inventions have been described in their preferred embodiments, the foregoing description should be considered solely as an example and not in any way as restrictive since, under the inventive concept mentioned hereinabove variations can be made which may fall within the scope sought for the present inventions.

I claim:

1. An apparatus for extraction of metal values from foundry sands, which comprises:

a thermostated column including a chamber for processing an aqueous pulp and having a double wall defining a jacket through which a heating fluid is circulated; said chamber also has an air inlet at the bottom and an upper opening for receiving the components for forming said pulp;

an air supply source including a decarbonating device and a humidifier, said source being in flow communication with the thermostated column to supply this with air in a preselected ratio; and a heating system connected with the column jacket for supplying the latter with heating fluid for maintaining the column at a predetermined temperature.

2. The apparatus of claim 1, wherein the column includes a device placed adjacent the air inlet for sparging the decarbonated and humidified air being supplied into the column.

3. The apparatus of claim 1, wherein the sparging device comprises a membrane having a plurality of orifices through which the airflow supplied into the column passes to divide said flow which in turn produces a suitable suspension and homogenization of said pulp.

4. The apparatus of claim 1, further including a frosted glass cap to seal the opening in the column in order to avoid air and foams from leaking.

5. The apparatus of claim 1, which the column has inlet and outlet means for circulation of the heating fluid through the jacket thereof.

6. The apparatus of claim 1, wherein the column includes a valve for extracting samples of the pulp during the metal values extraction process.

7. The apparatus of claim 1, wherein the column comprises means for removing the pulp from same.

8. The apparatus of claim 1, wherein the air supply source includes a device for measuring and controlling the airflow into the column.

9. The apparatus of claim 1, further including an air admission valve in connection with the air supply source.

10. The apparatus of claim 1, further including means for controlling the pH in the pulp in a constant value.

11. The apparatus of claim 1, wherein the heating system comprises means for measuring and controlling the temperature of the heating fluid.

* * * * *